United States Patent
Patel et al.

(10) Patent No.: US 11,835,148 B2
(45) Date of Patent: Dec. 5, 2023

(54) COMPACT CONTROLLED VALVE WITH INTEGRATED ORIFICES FOR PRECISE MIXING

(71) Applicant: FLOW CONTROL LLC, Beverly, MA (US)

(72) Inventors: Akshaykumar Patel, Santa Ana, CA (US); Derrick Tran, Yorba Linda, CA (US)

(73) Assignee: FLOW CONTROL LLC, Beverly, MA (US)

( * ) Notice: Subject to any disclaimer, the term of this patent is extended or adjusted under 35 U.S.C. 154(b) by 0 days.

(21) Appl. No.: 16/875,490

(22) Filed: May 15, 2020

(65) Prior Publication Data

US 2023/0279961 A1 Sep. 7, 2023

Related U.S. Application Data

(60) Provisional application No. 62/848,148, filed on May 15, 2019.

(51) Int. Cl.
*B01F 23/10* (2022.01)
*B01F 35/221* (2022.01)
(Continued)

(52) U.S. Cl.
CPC ............ *F16K 19/00* (2013.01); *B01F 23/191* (2022.01); *B01F 23/232* (2022.01);
(Continued)

(58) Field of Classification Search
CPC ............ Y10T 137/87684; F16K 19/00; B01F 23/191; B01F 23/232; B01F 23/451; B01F 25/1051; B01F 35/2217
(Continued)

(56) References Cited

U.S. PATENT DOCUMENTS 2,503,901 A 4/1950 Chace
3,977,608 A * 8/1976 Bullock ............... B05B 7/1281
239/371
(Continued)

FOREIGN PATENT DOCUMENTS

WO 93/01123 1/1993
WO 00/10909 3/2000
(Continued)

OTHER PUBLICATIONS

"Fixed Orifice Flow Control Restrictor Valves" www.kepner.com (Dec. 14, 2004) https:/ /web.archive.org/web/20041214173126/ https://www.kepner.com/flow_restrictor.html.
(Continued)

*Primary Examiner* — William M McCalister
(74) *Attorney, Agent, or Firm* — Ware, Fressola, Maguire Barber LLP (57) ABSTRACT

A control valve features a first housing and a second housing. The first housing includes a first inlet port having a first inlet port orifice member with a first inlet port orifice size configured to provide a first inlet fluid with a first inlet volumetric flow rate, the first inlet port orifice member being detachably coupled inside the first inlet port; includes a second inlet port having a second inlet port orifice member with a second inlet port orifice size configured to provide a second inlet fluid with a second inlet volumetric flow rate, the second inlet port orifice member being detachably coupled inside the second inlet port; and includes a first housing rim configured to extend from the first fixed inlet and the second fixed inlet. The second housing includes a second housing rim coupled to the first housing rim and configured to form a mixture chamber to mix the first inlet fluid received from the first fixed inlet orifice and the second inlet fluid received from the second fixed inlet orifice and provide a mixture chamber fluid; and an outlet port having (Continued)

Cross-Sectional View of Compact Mixing Valve an outlet port orifice with an outlet port orifice size configured to provide the mixture chamber fluid as an outlet port fluid having an outlet volumetric flow rate. The outlet port fluid has a mixture ratio of the first inlet fluid and the second inlet fluid for a particular application that depends on dimensions of the first inlet port orifice size, the second inlet port orifice size and the outlet port orifice size.

16 Claims, 4 Drawing Sheets

(51) Int. Cl.
- *B01F 25/00* (2022.01)
- *F16K 11/00* (2006.01)
- *B01F 23/451* (2022.01)
- *B01F 23/232* (2022.01)

(52) U.S. Cl.
CPC ........ *B01F 23/451* (2022.01); *B01F 25/1051* (2022.01); *B01F 35/2217* (2022.01); *Y10T 137/87684* (2015.04)

(58) Field of Classification Search
USPC .......................................................... 137/606
See application file for complete search history.

(56) References Cited

U.S. PATENT DOCUMENTS

| | | | |
|---|---|---|---|
| 4,132,361 A * | 1/1979 | Ryd | B05B 7/1254 137/896 |
| 4,173,296 A | 11/1979 | Marshall | |
| RE30,301 E | 6/1980 | Zygiel | |
| 4,290,450 A * | 9/1981 | Swanson | F16K 11/24 137/606 |
| 4,523,697 A | 6/1985 | Jeans | |
| 4,699,173 A * | 10/1987 | Rohling | B01F 35/2213 137/859 |
| 4,716,932 A | 1/1988 | Adams, Jr. | |
| 4,915,123 A * | 4/1990 | Morgovsky | B01F 23/19 137/606 |
| 4,953,593 A * | 9/1990 | Edwards | B67D 1/0082 251/205 |
| 4,991,625 A * | 2/1991 | Manganaro | E03C 1/04 222/144.5 |
| 5,012,837 A * | 5/1991 | Zepp | F04C 13/001 137/99 |
| 5,121,855 A | 6/1992 | Credle, Jr. | |
| 5,139,225 A * | 8/1992 | Olson | F16K 27/003 251/335.2 |
| 5,172,713 A * | 12/1992 | Hall | F16K 11/24 251/38 |
| 5,188,255 A | 2/1993 | Du | |
| 5,656,313 A | 8/1997 | Gibney et al. | |
| 6,240,943 B1 * | 6/2001 | Smith | B01F 35/71805 137/496 |
| 6,572,258 B1 | 6/2003 | Holland | |
| 6,647,982 B1 * | 11/2003 | Zaiser | A61M 16/10 128/205.24 |
| 7,311,225 B2 | 12/2007 | Newton | |
| 7,448,553 B2 | 11/2008 | Schmitt | |
| 7,448,793 B2 * | 11/2008 | Kurosawa | B01F 25/45211 366/172.2 |
| 7,530,278 B2 * | 5/2009 | Litecky | G05D 11/132 73/861.53 |
| 7,914,517 B2 * | 3/2011 | Baran | A61M 25/0152 604/528 |
| 8,087,544 B2 | 1/2012 | Elsom et al. | |
| 8,122,912 B2 | 2/2012 | Shemer et al. | |
| 8,182,236 B2 | 5/2012 | Shaimi | |
| 8,281,669 B2 | 10/2012 | Ertl | |
| 8,540,120 B2 | 9/2013 | Newton et al. | |
| 8,752,541 B2 * | 6/2014 | Deng | F23N 1/007 137/119.06 |
| 8,807,392 B2 | 8/2014 | Smeller et al. | |
| 8,960,500 B2 | 2/2015 | Van Opstal et al. | |
| 9,101,245 B2 | 8/2015 | Rey et al. | |
| 9,709,188 B2 | 7/2017 | Williams et al. | |
| 9,723,943 B2 | 8/2017 | Beausire et al. | |
| 10,035,113 B2 | 7/2018 | Nasman et al. | |
| 10,301,159 B2 | 5/2019 | Feola | |
| 2002/0059958 A1 * | 5/2002 | Krog | G01N 35/08 137/606 |
| 2006/0056271 A1 * | 3/2006 | Kapila | B01F 25/4316 366/181.5 |
| 2008/0106969 A1 * | 5/2008 | Kojima | B01F 25/43141 366/134 |
| 2012/0180874 A1 | 7/2012 | Mellette | |
| 2013/0174926 A1 * | 7/2013 | Derakhshan | E03C 1/052 137/606 |
| 2014/0361042 A1 * | 12/2014 | Ziesel | B67D 1/0044 222/145.5 |
| 2017/0167068 A1 * | 6/2017 | Bao | B01F 25/3121 |
| 2018/0185796 A1 | 7/2018 | Eichenlaub et al. | |
| 2021/0069656 A1 * | 3/2021 | Meza | B01F 23/232 |

FOREIGN PATENT DOCUMENTS

| | | |
|---|---|---|
| WO | 02/12837 A1 | 2/2001 |
| WO | 2014/197619 A1 | 12/2014 |

OTHER PUBLICATIONS

"Precision Orifices (Flow Restrictors) for Flow Control" www.industrialspec.com (Jan. 8, 2016) https://web.archive .org/web/20190503210729/https://www.industrialspec.com/about-us/blog/category/precision-orifices/9.

"Fixed orifice restrictors with reverse flow check" apps.boschrexroth.com; (Accessed Jun. 5, 2019) http://apps.boschrexroth.com/products/compact-hydraulics/chcatalog/pdf/GSU.pdf.

* cited by examiner

*FIG. 1*: An Example of a Mixing Assembly for Blended Gases
(PRIOR ART)

*FIG. 2*: A Nitrogen Infused Mixing Assembly for Coffee
(PRIOR ART)

FIG. 3: Flow vs. Pressure through Small Orifices

Figure 4. Cross-Sectional View of Compact Mixing Valve

Figure 5. Top Assembly View

Figure 6. Bottom Assembly View

Figure 7. Cross-Sectional View with Pressurized Tank Option

Figure 8. Cross-Sectional View with Pump Option

Figure 9. Another Example of Applications/Configurations

Figure 10. Another Example of Applications/Configurations

COMPACT CONTROLLED VALVE WITH INTEGRATED ORIFICES FOR PRECISE MIXING

CROSS-REFERENCE TO RELATED APPLICATION

This application claims benefit to provisional patent application Ser. No. 62/848,148, filed 15 May 2019, which is hereby incorporated by reference in its entirety.

BACKGROUND OF THE INVENTION

1. Field of the Invention

The present invention relates to a valve; and more particularly to a control valve for mixing fluids, including gases, a gas and liquid, and two liquids.

2. Brief Description of Related Art

Figure 1:
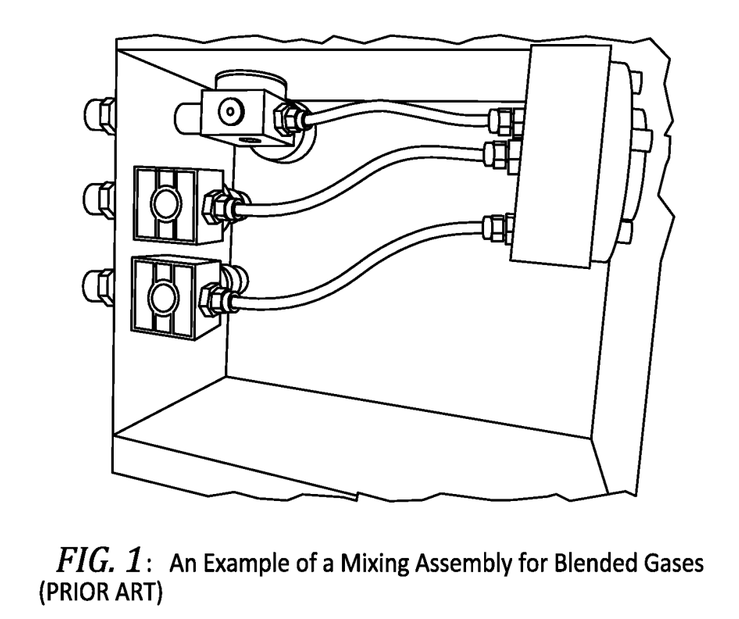
FIG. 1 shows a photograph of an example of a mixing assembly for blended gases that is known in the art.
Figure 2:
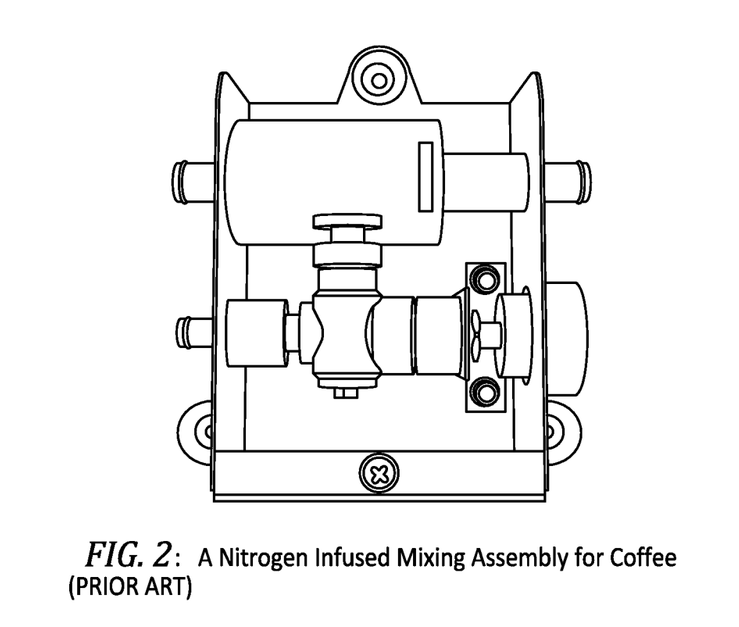
FIG. 2 shows a photograph of a nitrogen gas infused mixing assembly for coffee that is known in the art.

Other devices use multiple, separate components, i.e., fittings, control valves, check valves, manifold, enclosure, hoses, and fasteners to assemble into a single purposed device for mixing which are complex, bulky and costly. The main parts of these devices use special valves to adjust the amount of fluids coming into the mixing chamber. See FIGS. 1 and 2 for existing devices.

Some of the Shortcomings of the Above Mentioned Devices

Other devices use multiple parts, time-consuming and costly assembly. They could have unreliable mixing ratio; are prone to leaking, assembly errors, bulky and difficult to fit in tight space. These devices require frequent adjustments/calibrations to achieve desired mixing ratio due to the nature of the components used, e.g., a ball or a needle typed valve. Another limitation is if a very small amount of gas is required, the ball/needle valves are not precise enough to adjust and very difficult to dial in to achieve the desired mixing level. The existing devices have a single application, e.g., gas mixed with liquid, gas mixed with gas, or liquid mixed liquid.

SUMMARY OF THE PRESENT INVENTION

Specific Embodiments

By way of example, and according to some embodiments, the present invention may include, or take the form of, a valve, featuring a control valve having a first housing and a second housing.

The first housing may include a first inlet port having a first inlet port orifice member configured with a first inlet port orifice with a first inlet port orifice size to provide a first inlet fluid with a first inlet volumetric flow rate, include a second inlet port having a second inlet port orifice member configured with a second inlet port orifice with a second inlet port orifice size to provide a second inlet fluid with a second inlet volumetric flow rate, and include a first housing rim configured to extend from the first inlet port and the second inlet port.

The second housing may include a second housing rim configured to extend from the second housing. The second housing rim may be coupled to the first housing rim and forming a mixture chamber to mix the first inlet fluid received from the first fixed inlet orifice and the second inlet fluid received from the second fixed inlet orifice and provide a mixture chamber fluid. The second housing may also include an outlet port orifice member configured with an outlet port orifice having an outlet port orifice size to provide the mixture chamber fluid as an outlet port fluid having an outlet volumetric flow rate. The outlet port fluid may have a mixture ratio of the first inlet fluid and the second inlet fluid that depends on dimensions of the first inlet port orifice size, the second inlet port orifice size and the outlet port orifice size.

By way of further example, the control valve may also include one or more of the following features:

The first inlet port orifice member may be detachably coupled inside the first inlet port; or the second inlet port orifice member is detachably coupled inside the second inlet port; or both the first inlet port orifice member is detachably coupled inside the first inlet port and the second inlet port orifice member is detachably coupled inside the second inlet port.

The first inlet port orifice member may be integrated into the first housing; or the second inlet port orifice member may be integrated into the first housing; or both the first inlet port orifice member may be integrated into the first housing and the second inlet port orifice member may be integrated into the first housing.

The outlet port orifice member may be integrated into, or detachably coupled to, the second housing.

The control valve may include a first check valve and a second check valve. The first inlet port may be configured to receive the first check valve that allows the first inlet fluid to pass from the first inlet port, through the first fixed inlet orifice and to the mixture chamber and prevents backflow from the mixture chamber back to the first inlet port. The second inlet port may be configured to receive the second check valve that allows the second inlet fluid to pass from the second inlet port, through the second fixed inlet orifice and to the mixture chamber and prevents backflow from the mixture chamber back to the second inlet port.

The control valve may include an O-ring; and either the first housing rim or the second housing rim may include a groove configured to receive the O-ring in order to seal the first housing rim of the first housing and the second housing rim of the second housing.

The first inlet port orifice member and/or the second inlet port orifice member may be replaceable. For example, the first inlet port orifice member may be replaced with a different first inlet port orifice member having a different first inlet port orifice size to achieve a different desired mixture ratio of the first inlet fluid and the second inlet fluid for a different application. Moreover, the second inlet port orifice member may be replaced with a different second inlet port orifice member having a different second inlet port orifice size to achieve a different desired mixture ratio of the first inlet fluid and the second inlet fluid for a different application.

The first inlet port may include a first inner channel with a first threaded inner channel surface with threads configured therein; and the first inlet port orifice member may include a first threaded outer surface with corresponding first threads for detachably coupling to the first threads on the first threaded inner channel surface inside the first inlet port.

Similarly, the second inlet port may include a second inner channel with a second threaded inner channel with second threads configured therein; and the second inlet port orifice member may include a second threaded outer surface with corresponding second threads for detachably coupling to the second threads on the second threaded inner channel surface of the second inlet port.

The first inlet fluid may be a gas; the second inlet fluid may be a liquid; and the outlet port fluid may be a gas infused liquid.

The first inlet fluid may be a first gas; the second inlet fluid may be a second gas; and the outlet port fluid may be a gas mixture having the first gas and the second gas.

The first inlet fluid may be a first liquid; the second inlet fluid may be a second liquid; and the outlet port fluid may be a liquid mixture having the first liquid and the second liquid.

Each inlet port may be coupled to a respective fluid storage container; the outlet port may be coupled to a suction pump configured to draw respective inlet fluids from the respective fluid storage container through respective inlet port orifices, into the mixture chamber for mixing the respective inlet fluids, and drawing a corresponding mixture chamber fluid as an outlet port fluid through the outlet port orifice and from the outlet port; and the outlet port fluid may have a corresponding mixture ratio of the respective inlet fluids that depends on the dimensions of the first inlet port orifice size, the second inlet port orifice size and the outlet port orifice size, as well as the suction pressure of the suction pump.

Each inlet port may be coupled to a respective pump/pressure vessel configured to provide respective pumped/pressurized inlet fluids through respective inlet port orifices, into a corresponding mixture chamber for mixing the respective pumped/pressurized inlet fluids, and pushing mixture chamber pumped/pressurized fluids through an outlet port orifice, and from the outlet port for providing the mixture chamber pumped/pressurized fluids as the outlet port fluid; and the outlet port fluid may have a corresponding mixture ratio of the respective pumped/pressurized inlet fluids that depends on the dimensions of the first inlet port orifice size, the second inlet port orifice size and the outlet port orifice size, as well as the respective pressure from the respective pump/pressure vessel.

Control Valve for Providing a Gas Infused Liquid

By way of further example, and according to some embodiments, the present invention may include, or take the form of, a valve, featuring a control valve having a first housing and a second housing.

The first housing may include a gas inlet port having a gas inlet port orifice member configured with a gas inlet port orifice having a gas inlet port orifice size to provide a gas with a gas inlet volumetric flow rate. The gas inlet port orifice member may be detachably coupled inside the gas inlet port. The first housing may include a liquid inlet port having a liquid inlet port orifice member configured with a liquid inlet port orifice having a liquid inlet port orifice size to provide a liquid with a liquid inlet volumetric flow rate. The liquid inlet port orifice member may be detachably coupled inside the liquid inlet port. The first housing may include a first housing rim configured to extend from the gas inlet port and the liquid inlet port.

The second housing may have a second housing rim configured to extend from the second housing. The second housing rim may be coupled to the first housing rim and form a mixture chamber to mix the gas received from the gas inlet port orifice and the liquid received from the liquid inlet port orifice and provide a mixture chamber fluid.

The second housing may include an outlet port configured with an outlet port orifice having an outlet port orifice size to provide the mixture chamber fluid as a gas infused liquid having an outlet volumetric flow rate. The gas infused liquid may have a mixture ratio of the gas and the liquid that depends on dimensions of the gas inlet port orifice size, the liquid inlet port orifice size and the outlet port orifice size.

Advantages

Figure 3:
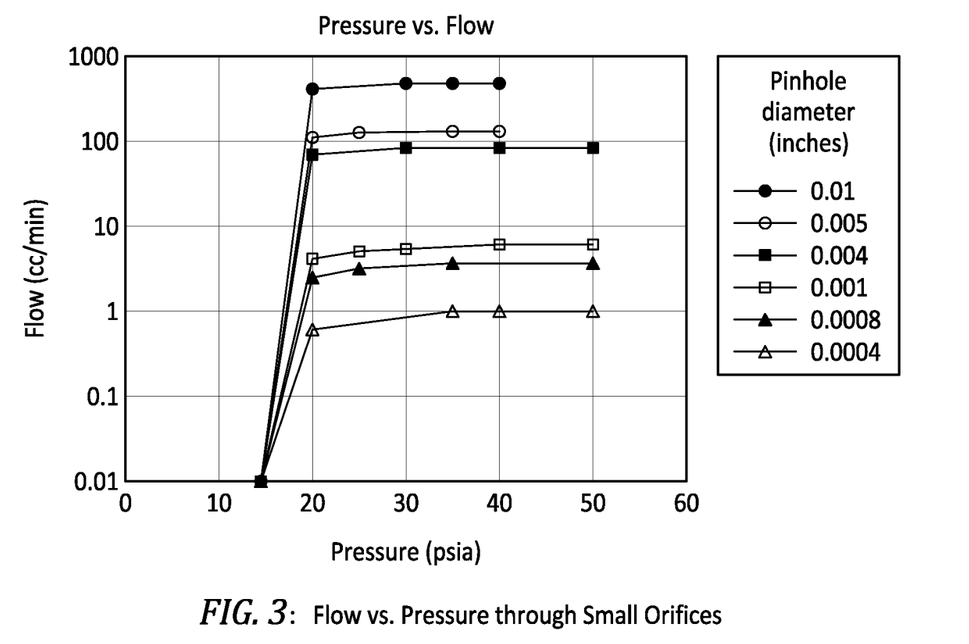
FIG. 3 shows a graph of flow (CC/min) vs. pressure (psia) through small orifices, e.g., including examples of orifices having pinhole diameters (inches) of 0.01", 0.005", 0.004", 0.001", 0.0008", and 0.0004".

Due to the nature of the fluid behavior flowed through a small orifice, the volumetric flow rate is almost constant within a wider pressure range as shown in FIG. 3. The present invention takes advantage of this behavior to produce precise mixture ratio without calibrations. This new compact control valve can be fitted into a smaller environment, or can be adapted into existing devices, such as pumps, manifolds, enclosures, etc. With a few necessary components integrated into this new compact control valve, it has a much less chance to leaking issues and assembly errors. This new compact control valve is also simple and does not require active monitoring and control which are used in much more complex and expensive system. It also can be used in multiple applications (e.g., gas-gas, gas-liquid, and liquid-liquid).

BRIEF DESCRIPTION OF THE DRAWING

The drawing, which is not necessarily drawn to scale, includes the following Figures.

Similar parts or components in Figures are labeled with similar reference numerals and labels for consistency. Every lead line and associated reference label for every element is not included in every Figure of the drawing to reduce clutter in the drawing as a whole.

DETAILED DESCRIPTION OF THE INVENTION

By way of example, and according to some embodiments, FIGS. 4 to 10 show various embodiments of compact controlled valves according to the present invention.

Figure 4:
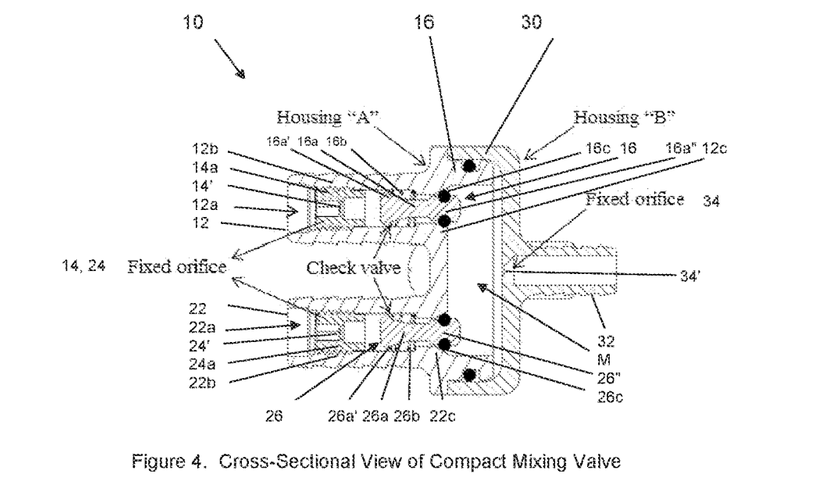
FIG. 4 shows a cross-sectional view of a compact mixing valve according to some embodiments of the present invention.
Figure 5:
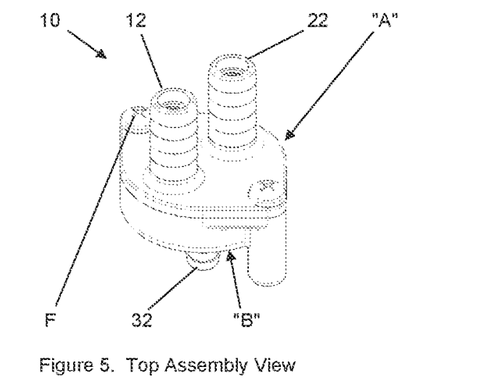
FIG. 5 shows a top assembly view of the compact mixing valve shown in FIG. 4.
Figure 6:
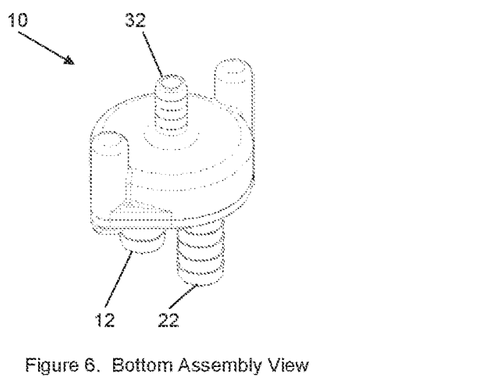
FIG. 6 shows a bottom assembly view of the compact mixing valve shown in FIG. 4.

In summary, the compact control valve has fixed orifices and check valves enclosed in a small housing assembly, e.g., consistent with that shown in FIGS. 4-10. The orifices/sizes can be replaced to produce certain volumetric flow rates based on particular applications. Orifices can be replaceable as shown in Housing A of FIG. 4 or can be an integrated part of the housing as shown in Housing B of FIG. 4. Built-in check valves are incorporated to prevent back flow, but they can be excluded for continuous duty applications with other arrangements. The housing assembly shown in FIGS. 5 and 6 shows hose barb connection for simplicity of presentation, housing body can have quick disconnect or any other types of connection.

Figure 7:
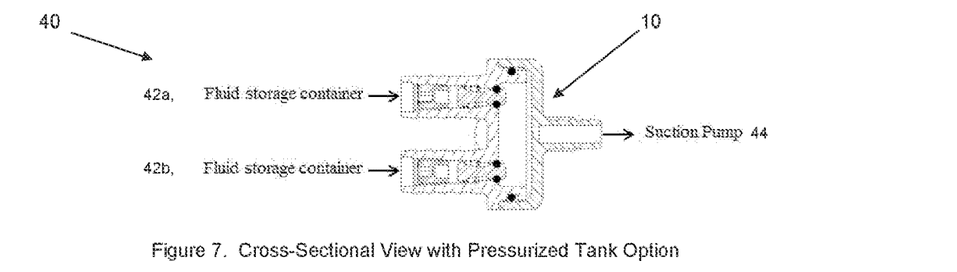
FIG. 7 shows a system having the compact mixing valve shown in FIG. 4 configured with a pressurized tank option, according to some embodiments of the present invention.
Figure 8:
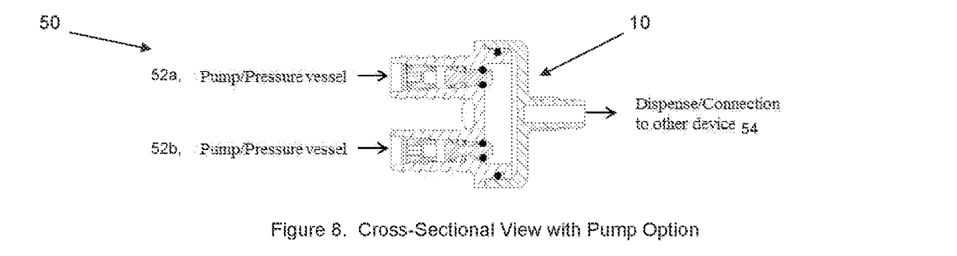
FIG. 8 shows another system having the compact mixing valve shown in FIG. 4 configured with a pump option, according to some embodiments of the present invention.

Two different fluids come in from the inlet ports, pass through the orifices and check valves; both fluids come together and get mixed at the exits from the check valves, and flow through the common port leading to an external vessel (tubing, reservoir, nozzle, etc.) According to the present invention, the mixture ratio is controlled by the sizes of the orifices installed in the valve housings A & B. If a different mixture ratio is required, then the orifices can be removed and replaced with different sizes to achieve the desired mixture ratio. Fluid entering in from the inlet port can be pressurized using a pump or pressure vessel as shown in FIG. 7; or fluid entering in from the inlet port can also be pulled in using a suction pump connected on the outlet of the device as shown in FIG. 8.

FIGS. 4-6

FIG. 4 shows a compact control valve generally indicated as 10 having a housing A and a housing B sealingly coupled together with an O-ring O so as to form a mixing or mixture chamber M between the housing A and the housing B for mixing inlet fluids.

By way of example, the first housing A may may include a first inlet port 12 that has a first inlet port orifice member 14 having a first inlet port orifice 14' with a first inlet port orifice size configured to provide a first inlet fluid with a first inlet volumetric flow rate. The first inlet port orifice member 14 may be detachably coupled inside the first inlet port 12, e.g., using a threaded coupling. The first housing A may include a second inlet port 22 that has a second inlet port orifice member 24 having a second inlet port orifice 24' with a second inlet port orifice size configured to provide a second inlet fluid with a second inlet volumetric flow rate. The second inlet port orifice member 24 may be detachably coupled inside the second inlet port 22, e.g., using a corresponding threaded coupling. The first housing A may include a first housing rim 16 configured to extend from the first fixed inlet port 12 and the second fixed inlet port 22.

By way of example, the second housing B may include a second housing rim 30 coupled to the first housing rim 16 and configured to form the mixture chamber M to mix the first inlet fluid received from and through the first fixed inlet orifice 14 and the second inlet fluid received from and through the second inlet port orifice member 24 and provide a mixture chamber fluid. The second housing B may include an outlet port 32 configured with an outlet port orifice member 34 having an outlet port orifice 34' with an outlet port orifice size configured to provide the mixture chamber fluid as outlet fluid having an outlet volumetric flow rate, where the outlet fluid has a mixture ratio of the first inlet fluid and the second inlet fluid for a particular application that depends on dimensions of the first inlet port orifice size, the second inlet port orifice size and the outlet port orifice size.

By way of example, the first inlet orifice member 14 may be configured as a first replaceable orifice member 14. For example, the first inlet port 12 may be configured with an inner channel 12a having a threaded inner channel surface 12b with inner threads, and the first replaceable orifice member 14 may have a threaded outer surface 14a with corresponding outer threads, e.g. so that the first replaceable orifice member 14 may be screwed into, and out of, the inner channel 12a of the first inlet port 12 to replace the first inlet orifice member 14, consistent with that shown in FIG. 4. Depending on application, the first inlet orifice member 14 may be replaced to provide the compact valve 10 with a different inlet orifice member having a different orifice with a different orifice size configured to provide a first inlet fluid with a different inlet volumetric flow rate, e.g., to adjust the mixture ratio of the first and second inlet fluids.

Similarly, the second inlet orifice member 24 may be configured as a second replaceable orifice member 24. For example, the second inlet port 22 may be configured with an inner channel 22a having a threaded inner surface 22b with inner threads, and the second replaceable orifice member 24 may have a threaded outer surface 24a with corresponding outer threads, e.g. so that the second replaceable orifice member 14 may be screwed into, and out of, the inner channel 22a of the second inlet port 22 to replace the second inlet orifice member 24, consistent with that shown in FIG. 4. Similarly, depending on application, the second inlet orifice member 24 may be replaced to provide the compact valve 10 with a different inlet orifice member having a different orifice with a different orifice size configured to provide a second inlet fluid with a different inlet volumetric flow rate, e.g., to adjust the mixture ratio of the first and second inlet fluids.

The first housing A may include a first check valve 16, e.g. having a check valve body 16a, a spring 16b and an O-ring 16c. The spring 16b may be arranged between an extended portion 16a' on one end of the check valve body 16a and an inner wall portion 12c and configured to respond to inlet fluid pressure caused by inlet fluid flowing into the inner channel 12a, and compress to allow the inlet fluid to pass into the mixture chamber M. The O-ring 16c may be arranged in a narrowed/channel portion 16a" on an opposite end of the check valve body 16a and configured rest or be pulled/pushed against an outer wall portion 12c of the first inlet port 12 when the inlet fluid is not flowing into the inner channel 12a and the spring 16b is not compressed, so as to prevent the inlet fluid from the second inlet port 22 from passing through the mixture chamber M and into the inner channel 12a of the first inlet port 12.

The first housing A may also include a second check valve 26, e.g. having a check valve body 26a, a spring 26b and an O-ring 26c. The spring 26b may be arranged between an extended portion 26a' of the check valve body 26a and a corresponding inner wall portion 22c and configured to respond to inlet fluid pressure caused by inlet fluid flowing into the inner channel 12a, and compress to allow the inlet fluid to pass into the mixture chamber M. The O-ring 26c may be arranged in a narrowed/channel portion 26a" on a corresponding opposite end of the check valve body 26a and configured rest or be pulled/pushed against an outer wall portion 22c of the second inlet port 22 when the inlet fluid is not flowing into the inner channel 22a and the spring 26b is not compressed, so as to prevent the inlet fluid from the first inlet port 12 from passing through the mixture chamber M and into the inner channel 22a of the second inlet port 22.

In FIG. 4, the outlet port orifice member 34 is shown as a fixed orifice that is integrated in the housing B and not replaceable, e.g., unless the entire housing B is replaced. By way of example, the housing B may be made as a molded unit including a outlet port orifice member having an outlet port orifice with an outlet port orifice size. However, embodiments are envisioned, and the scope of the invention is intended to include, e.g. the fixed outlet port orifice member 34 being a replaceable outlet port orifice member similar to first and second inlet port orifice members 14 and 24. By way of example, and similar to that set forth above, the outlet port 32 may be configured with an inner channel having inner channel threads, and the replaceable outlet port orifice member may have a threaded outer surface configured with corresponding outer threads, e.g. so that the replaceable outlet port orifice member may be screwed into, and out of, the inner channel of the outlet port 34, consistent with that shown in FIG. 4 with respect to first and second inlet port orifice members and the first and second inlet ports 12, 22. In this embodiment, depending on application, the replaceable outlet port orifice member may be replaced to provide the compact valve 10 with a different outlet port orifice member having a different orifice size configured to provide a outlet fluid with a different outlet volumetric flow rate, e.g., to adjust the mixture ratio of the first and second inlet fluids.

Moreover, and by way of further example, the control valve 10 in FIG. 4 includes replaceable inlet port orifice members 14, 24 that may be screwed into and out of housing A. However, embodiments are envisioned having, and the scope of the invention is intended to include, implementations where the replaceable inlet port orifice members 14, 24 are fixed orifices that are integrated in the housing A like the fixed orifice forming part of the outlet port orifice member 34 of housing B.

The housing "A" and housing "B" are fastened together with screw-like fasteners F, one of which is labeled in FIG. 5.

Embodiments are also envisioned, and the scope of the invention is intended to include, having a check valve configured in the outlet port of housing "B", e.g., similar to the check valves 16, 26 configured in housing "A".

FIGS. 7-8: The Pressurized Tank and Pump Options

By way of example, FIG. 7 shows a compact control valve generally indicated as 40 having the compact mixing valve 10 in FIG. 4 configured with a pressurized tank option. In operation, and consistent with that set forth in relation to FIG. 4, each inlet port is coupled to a respective fluid storage container 42a, 42b, an outlet port is coupled to a suction pump 44 configured to draw each inlet fluid from the respective fluid storage container 42a, 42b through respective inlet port orifices, into a mixture chamber of the compact mixing valve 10 for mixing the respective inlet fluids, and drawing a mixture chamber fluid as an outlet port fluid through an outlet port orifice and from the outlet port. In this embodiment, the outlet port fluid from the compact control valve 40 may have a corresponding mixture ratio of the first inlet fluid and the second inlet fluid for a particular application that depends on the dimensions of the first inlet port orifice size, the second inlet port orifice size and the outlet port orifice size, as well as the suction pressure of the suction pump 44.

By way of further example, FIG. 8 shows another compact control valve generally indicated as 50 having the compact mixing valve 10 in FIG. 4 configured with a pump option. In operation, and consistent with that set forth in relation to FIG. 4, each inlet port is coupled to a respective pump/pressure vessel 52a, 52b configured to provide respective pumped/pressurized fluid through respective inlet port orifices, into a corresponding mixture chamber of the compact mixing valve for mixing the respective pumped/pressurized inlet fluids, and pushing a mixture chamber pumped/pressurized fluid through an outlet port orifice, and from an outlet port coupled to a dispense/connection 54 for providing the mixture chamber pumped/pressurized fluid as the outlet port fluid to another device. In this embodiment, the outlet port fluid from the compact control valve 50 may have a corresponding mixture ratio of the first inlet fluid and the second inlet fluid for a particular application that depends on the dimensions of the first inlet port orifice size, the second inlet port orifice size and the outlet port orifice size, as well as the respective pressure from the respective pump/pressure vessel 52a, 52b.

Figure 9:
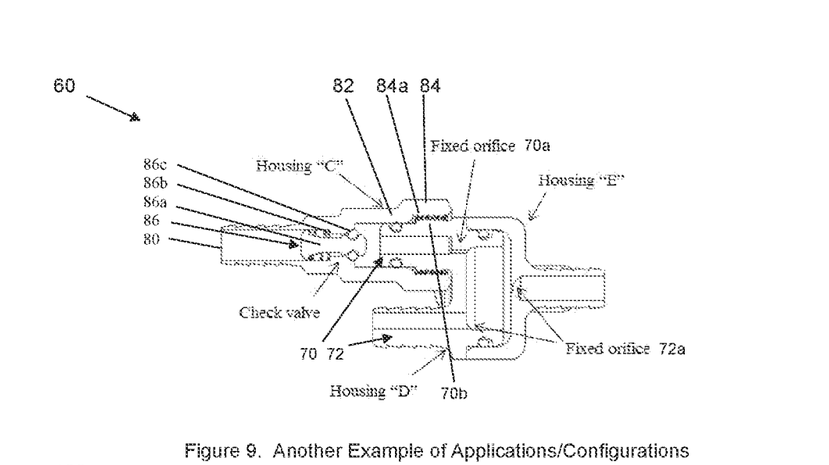
FIG. 9 shows a cross-sectional view of still another system having a compact mixing valve, e.g., including where the check valve may be excluded on the liquid side, according to some embodiments of the present invention.

FIG. 9

Based on certain applications, the compact controlled valve can have a different placement and arrangement of the orifice(s) and check valve(s). By way of example, FIG. 9 shows an example of a compact control valve generally indicated as 60, in which one fluid is gas and other is liquid, e.g., where the check valve can be excluded for liquid side of fluid entry and check valve on gas side can be placed before the orifice. The end fittings of this new compact controlled valve can be fitted with different sizes and types of fittings such as barb, quick-connect, threaded, clip-on fittings for ease of connection. By way of example, FIG. 9 shows a barb type connection.

The compact control valve 60 may include a housing C, a housing D and a housing E.

The housing E corresponds to housing B in FIG. 4.

The housing D corresponds to housing A in FIG. 4, includes two inlet ports 70, 72 having fixed inlet port orifices 70a, 72a, and may not include check valves like check valves 16 and 26 in FIG. 4, e.g., according to some embodiments. The housings D and E are coupled by an O-ring like O-ring O in FIG. 4 so as to form a mixture chamber like mixture chamber M in FIG. 4.

The housing C may include an inlet port 80, an intermediate portion 82 and a coupling portion 84. The housing C may be coupled onto the first inlet port 70. By way of example, the first inlet port 70 may be configured with a threaded outer surface 70b, and the coupling portion 84 may have a threaded inner surface 84a, e.g., so that the threaded inner surface 84a of the coupling portion 84 may be screwed onto the threaded outer surface 70b of the inlet port 70 to couple the housing C onto the inlet port 70, consistent with that shown in FIG. 9.

The housing C may also include a check valve 86 having a check valve body 86a, a spring 86b and an O-ring 86c, which are configured to operate similar to check valves 16, 26 shown in FIG. 4.

Consistent with that set forth herein, embodiments are envisioned having, and the scope of the invention is intended to include, implementations in which the inlet port orifices 70a, 72a form part of replaceable inlet port orifice members like members 14 and 24 (FIG. 4), and in which the outlet port orifice of the housing E forms part of a replaceable outlet port orifice member like member 34 (FIG. 4).

Embodiments are also envisioned, and the scope of the invention is intended to include, having a check valve configured in the outlet port of housing "E", e.g., similar to the configuration of the check valve 86 in the housing "C".

Figure 10:
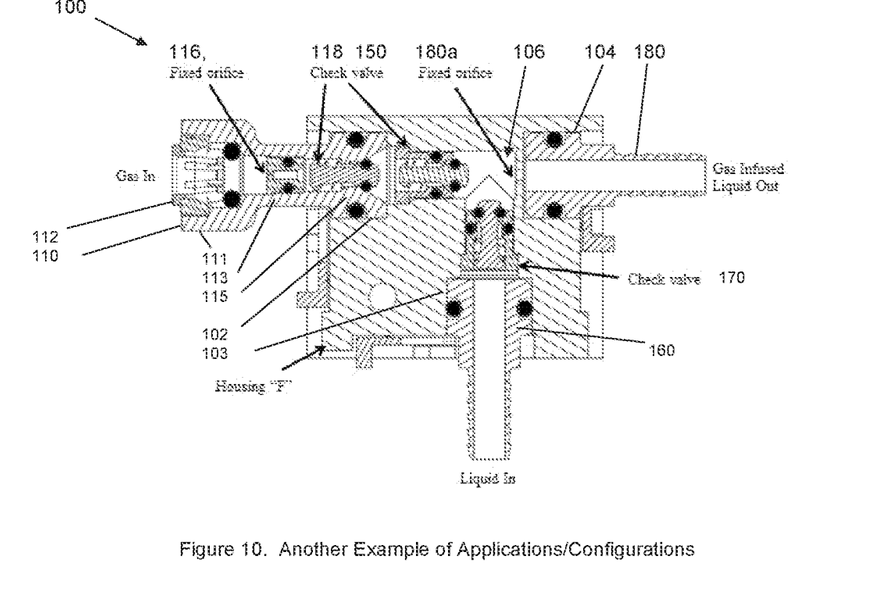
FIG. 10 shows a cross-sectional view of still another system having a compact mixing valve with a double check valve arrangement, e.g., including where the double check valve arrangement may include an extra/double check valve on the gas side, according to some embodiments of the present invention.

FIG. 10

Additionally in certain applications, a compact controlled valve according to the present invention can have a double check valve arrangement. For example, FIG. 10 shows a compact controlled valve generally indicated as 100 in which the double check valve arrangement is used on one fluid which is gas; this provides additional protection against liquid leaking back into the gas inlet port. In FIG. 10, the compact control valve 100 is configured to receive one fluid that is gas (gas in) and another other fluid that is liquid (liquid in), and provides a gas infused liquid (gas infused liquid out) as shown.

In particular, the compact control valve 100 includes a housing F configured with a gas inlet receiving cavity 102, a liquid inlet receiving cavity 103, a gas-infused-liquid outlet receiving cavity 104, and a mixture chamber 106. The compact control valve 100 also includes a gas inlet port 110 having an inlet port portion 111, an intermediate portion 113 and a coupling portion 115. The inlet port portion 111 is configured to receive a gas inlet coupling 112 for providing gas from a gas source (not shown) to the compact control valve 100.

The gas inlet port 110 also includes an inlet port orifice member 116 arranged in the intermediate portion 113 with an O-ring. The inlet port orifice member 116 is configured with a fixed orifice having a gas inlet port orifice size configured to provide gas with a gas inlet volumetric flow rate and allow inlet gas to flow through the gas inlet port 110, e.g., similar to the inlet port orifice members 14 and 24 in FIG. 4.

The gas inlet port 110 also includes a gas check valve 118 arranged in the coupling portion 115. The gas check valve 118 has a check valve body, a spring and an O-ring, is configured to allow gas to flow through the gas inlet port 110 and to prevent liquid from flowing back into the gas inlet port 110, and operates similar to check valves 16, 26 shown in FIG. 4.

The compact control valve 100 includes an optional 2nd gas check valve 150 having a check valve body portion arranged in a gas inlet portion of the mixture chamber/cavity 106 with an O-ring as shown. The 2nd gas check valve 150 has a check valve body, a spring and an O-ring arranged in the check valve body portion, is configured to allow gas to flow through the gas inlet port 110 and to prevent liquid from flowing back into the gas inlet port 110, and operates similar to check valves 16, 26 shown in FIG. 4, as well as the gas check valve 118. The check valve 118 and the optional 2nd gas check valve 150 combine to form the double check valve arrangement, e.g., according to some embodiments of the present invention.

The compact control valve 100 includes a liquid inlet port 160 configured to provide an inlet liquid to the mixture chamber 106, e.g., consistent with that set forth in relation to FIGS. 4 and 7-8. The liquid inlet port 160 may be configured with an inlet port orifice member having a fixed orifice with a inlet port orifice size to provide liquid with a liquid inlet volumetric flow rate and allow inlet liquid to flow through the liquid inlet port 160, e.g., similar to the inlet port orifice members 14 and 24 in FIG. 4.

The compact control valve 100 includes a liquid check valve 170 having a check valve body portion arranged in a liquid inlet portion of the mixture chamber/cavity 106 with an O-ring as shown. The liquid check valve 170 has a check valve body, a spring and an O-ring arranged in the check valve body portion, is configured to allow liquid to flow through the liquid inlet port 160 and to prevent gas from flowing back into the liquid inlet port 160, and operates similar to check valves 16, 26 shown in FIG. 4.

The compact control valve 100 includes an outlet port 180 having an outlet port orifice 180a with an outlet port orifice size configured to provide the mixture chamber fluid as an outlet port fluid having an outlet volumetric flow rate. Consistent with that set forth herein, the outlet port fluid has a mixture ratio of the first inlet fluid and the second inlet fluid for a particular application that depends on dimensions of the gas inlet port orifice size, the liquid inlet port orifice size and the outlet port orifice size.

OTHER EMBODIMENTS

By way of example, the control valve according to the present invention is shown and described having two inlet ports and one outlet port. However, embodiments are envisioned having, and the scope of the invention is intended to include, control valves with three or more inlet ports, where each inlet port has a respective inlet port orifice member having a respective inlet port orifice with a respective inlet port orifice size configured to provide a respective inlet port fluid with a respective inlet port volumetric flow rate. Moreover, embodiments are also envisioned having, and the scope of the invention is also intended to include, control valves with multiple mixing or mixture chambers and multiple outlet ports, where multiple inlet ports provide multiple inlet fluids to a respective mixture chamber, and where the respective mixture chamber provides a respective mixture chamber fluid to a respective outlet port.

Dimensions of the Inlet/Outlet Port Orifices

The dimensions of the inlet and outlet port orifices will depend on the particular application of the compact controlled valve. By way of example, one application may require that the inlet and outlet port orifices have one set of dimensions, and another application may require that the inlet and outlet port orifices have another set of dimensions.

The scope of the invention is not intended to be limited to any particular dimension of the inlet and outlet port orifices or any particular set of dimensions.

Finally, for any particular application the dimensions of the inlet and outlet port orifices may be determined by a person skilled in the art without undue experimentation, e.g., so as to provide an outlet port fluid having a desired mixture ratio of a first inlet fluid and a second inlet fluid based upon a first inlet port orifice size, a second inlet port orifice size and a outlet port orifice size.

Possible Applications

Applications of the present invention include:
Used for mixing liquid-liquid, gas-gas or gas-liquid for general industrial applications such as sanitization, laboratory uses; beverage applications such as nitrogen gas infused, carbonated, or blended gas (N2+CO2) beverages. This device can be fitted with a pump as an external fitting or used as stand-alone device with liquid and/or gas inputs to produce a desired mixed fluid.

THE SCOPE OF THE INVENTION

The embodiments shown and described in detail herein are provided by way of example only; and the scope of the invention is not intended to be limited to the particular configurations, dimensionalities, and/or design details of these parts or elements included herein. In other words, one skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein.

Although the invention has been described and illustrated with respect to exemplary embodiments thereof, the foregoing and various other additions and omissions may be made therein and thereto without departing from the spirit and scope of the present invention.

What we claim is:

1. A control valve comprising:
a first housing including a first inlet port having a first inlet port orifice member configured with a first inlet port orifice with a first inlet port orifice size to provide a first inlet fluid with a first inlet volumetric flow rate, including a second inlet port having a second inlet port orifice member configured with a second inlet port orifice with a second inlet port orifice size to provide a second inlet fluid with a second inlet volumetric flow rate, and including a first housing rim configured to extend from the first inlet port and the second inlet port; and
a second housing having a second housing rim configured to extend from the second housing, the second housing rim being coupled to the first housing rim and forming a mixture chamber to mix the first inlet fluid received from the first fixed inlet orifice and the second inlet fluid received from the second fixed inlet orifice and provide a mixture chamber fluid, and also including an outlet port orifice member configured with an outlet port orifice having an outlet port orifice size to provide the mixture chamber fluid as an outlet port fluid having an outlet volumetric flow rate, the outlet port fluid having a mixture ratio of the first inlet fluid and the second inlet fluid that depends on dimensions of the first inlet port orifice size, the second inlet port orifice size and the outlet port orifice size.

2. A control valve according to claim 1, wherein
the first inlet port orifice member is detachably coupled inside the first inlet port; or
the second inlet port orifice member is detachably coupled inside the second inlet port; or
the first inlet port orifice member is detachably coupled inside the first inlet port and the second inlet port orifice member is detachably coupled inside the second inlet port.

3. A control valve according to claim 1, wherein
the first inlet port orifice member is integrated into the first housing; or
the second inlet port orifice member is integrated into the first housing; or
both the first inlet port orifice member is integrated into the first housing and the second inlet port orifice member is integrated into the first housing.

4. A control valve according to claim 1, wherein the outlet port orifice member is integrated into, or detachably coupled to, the second housing.

5. A control valve according to claim 1, wherein
the control valve comprises a first check valve and a second check valve;
the first inlet port is configured to receive the first check valve that allows the first inlet fluid to pass from the first inlet port, through the first fixed inlet orifice and to the mixture chamber and prevents backflow from the mixture chamber back to the first inlet port; and
the second inlet port is configured to receive the second check valve that allows the second inlet fluid to pass from the second inlet port, through the second fixed inlet orifice and to the mixture chamber and prevents backflow from the mixture chamber back to the second inlet port.

6. A control valve according to claim 1, wherein
the control valve comprises an O-ring; and
either the first housing rim or the second housing rim includes a groove configured to receive the O-ring in order to seal the first housing rim of the first housing and the second housing rim of the second housing.

7. A control valve according to claim 1, wherein the first inlet port orifice member and the second inlet port orifice member are replaceable with a different first inlet port orifice member having a different first inlet port orifice size and with a different second inlet port orifice member having a different second inlet port orifice size to achieve a different desired mixture ratio of the first inlet fluid and the second inlet fluid for a different application.

8. A control valve according to claim 1, wherein
the first inlet port has a first inner channel with a first threaded inner channel surface with threads configured therein; and
the first inlet port orifice member has a first threaded outer surface with corresponding first threads for detachably coupling to the first threads on the first threaded inner channel surface inside the first inlet port.

9. A control valve according to claim 1, wherein
the second inlet port has a second inner channel with a second threaded inner channel with second threads configured therein; and
the second inlet port orifice member has a second threaded outer surface with corresponding second threads for detachably coupling to the second threads on the second threaded inner channel surface of the second inlet port.

10. A control valve according to claim 1, wherein
the first inlet fluid is a gas;
the second inlet fluid is a liquid; and
the outlet port fluid is a gas infused liquid.

11. A control valve according to claim 1, wherein
the first inlet fluid is a first gas;
the second inlet fluid is a second gas; and
the outlet port fluid is a gas mixture having the first gas and the second gas.

12. A control valve according to claim 1, wherein
the first inlet fluid is a first liquid;
the second inlet fluid is a second liquid; and
the outlet port fluid is a liquid mixture having the first liquid and the second liquid.

13. A control valve according to claim 1, wherein
each inlet port is coupled to a respective fluid storage container;
the outlet port is coupled to a suction pump configured to draw respective inlet fluids from the respective fluid storage container through respective inlet port orifices, into the mixture chamber for mixing the respective inlet fluids, and drawing a corresponding mixture chamber fluid as an outlet port fluid through the outlet port orifice and from the outlet port; and
the outlet port fluid has a corresponding mixture ratio of the respective inlet fluids that depends on the dimensions of the first inlet port orifice size, the second inlet port orifice size and the outlet port orifice size, as well as the suction pressure of the suction pump.

14. A control valve according to claim 1, wherein
each inlet port is coupled to a respective pump/pressure vessel configured to provide respective pumped/pressurized inlet fluids through respective inlet port orifices, into a corresponding mixture chamber for mixing the respective pumped/pressurized inlet fluids, and pushing mixture chamber pumped/pressurized fluids through an outlet port orifice, and from the outlet port for providing the mixture chamber pumped/pressurized fluids as the outlet port fluid; and
the outlet port fluid has a corresponding mixture ratio of the respective pumped/pressurized inlet fluids that depends on the dimensions of the first inlet port orifice size, the second inlet port orifice size and the outlet port orifice size, as well as the respective pressure from the respective pump/pressure vessel.

15. A control valve comprising:
a first housing including a gas inlet port having a gas inlet port orifice member configured with a gas inlet port orifice having a gas inlet port orifice size to provide a gas with a gas inlet volumetric flow rate, the gas inlet port orifice member being detachably coupled inside the gas inlet port, including a liquid inlet port having a liquid inlet port orifice member configured with a liquid inlet port orifice having a liquid inlet port orifice size to provide a liquid with a liquid inlet volumetric flow rate, the liquid inlet port orifice member being detachably coupled inside the liquid inlet port, and including a first housing rim configured to extend from the gas inlet port and the liquid inlet port; and
a second housing having a second housing rim configured to extend from the second housing, the second housing rim being coupled to the first housing rim and forming a mixture chamber to mix the gas received from the gas inlet port orifice and the liquid received from the liquid inlet port orifice and provide a mixture chamber fluid, and also including an outlet port configured with an outlet port orifice having an outlet port orifice size to provide the mixture chamber fluid as a gas infused liquid having an outlet volumetric flow rate, the gas infused liquid having a mixture ratio of the gas and the liquid that depends on dimensions of the gas inlet port orifice size, the liquid inlet port orifice size and the outlet port orifice size.

16. A control valve according to claim 15, wherein the outlet port orifice member is integrated into, or detachably coupled to, the second housing.

* * * * *